United States Patent
Gavin et al.

(10) Patent No.: US 7,784,642 B2
(45) Date of Patent: Aug. 31, 2010

(54) RUGGEDIZED LIGHTWEIGHT CONTAINER LID

(76) Inventors: Kevin Gavin, 2780 Shannon Rd., Northbrook, IL (US) 60062; Eric Monsen, 3450 N. Lake Shore Dr., #3106, Chicago, IL (US) 60657; Gordon Eden, 1860 Paddington Ave., Naperville, IL (US) 60563-2030

( * ) Notice: Subject to any disclaimer, the term of this patent is extended or adjusted under 35 U.S.C. 154(b) by 234 days.

(21) Appl. No.: 10/894,512

(22) Filed: Jul. 20, 2004

(65) Prior Publication Data

US 2005/0224507 A1 Oct. 13, 2005

Related U.S. Application Data

(60) Provisional application No. 60/561,838, filed on Apr. 13, 2004.

(51) Int. Cl.
*B65D 51/04* (2006.01)
*B65D 43/14* (2006.01)
(52) U.S. Cl. .................. 220/836; 220/826; 220/843; 220/844; 220/908
(58) Field of Classification Search ............. 220/826, 220/836, 840, 841, 843, 908
See application file for complete search history.

(56) References Cited

U.S. PATENT DOCUMENTS

| 2,677,479 | A | * | 5/1954 | Yoneo | 220/840 |
|---|---|---|---|---|---|
| 3,886,645 | A | * | 6/1975 | Schurman | 29/434 |
| 4,342,402 | A | | 8/1982 | Jungles | |
| 4,445,623 | A | | 5/1984 | Kolling et al. | |
| 4,615,464 | A | * | 10/1986 | Byrns | 220/4.23 |
| 4,650,089 | A | | 3/1987 | Sanders | |
| 4,771,940 | A | | 9/1988 | Taylor | |
| 4,949,886 | A | | 8/1990 | Sanders | |
| 5,088,616 | A | | 2/1992 | Susko et al. | |
| 5,564,586 | A | | 10/1996 | Goodwin | |
| 6,000,550 | A | * | 12/1999 | Simpson et al. | 206/711 |
| 6,616,008 | B2 | | 9/2003 | Lemajeur | |
| 2003/0146230 | A1 | | 8/2003 | Eaton et al. | |
| 2003/0209557 | A1 | | 11/2003 | Taylor | |

* cited by examiner

Primary Examiner—Robin Hylton

(57) ABSTRACT

The invention is a container lid product that combines a solid-molded hinge with a hollow-molded cover into a unitarily molded product, and a method for manufacturing the container lid product in a single molding operation and in a single mold.

2 Claims, 10 Drawing Sheets

RUGGEDIZED LIGHTWEIGHT CONTAINER LID

The invention is a ruggedized, lightweight, molded container lid product and a method for manufacturing the ruggedized, lightweight, molded container lid product.

The product of the invention is a one-piece, unitarily molded, container lid product that combines a lightweight, rigid, hollow-molded cover and a strong, durable, solid-molded hinge.

The product can be used on various containers; for example, waste containers, dumpsters, recycling bins, and various other containers that utilize pivotally connected lids to block a container opening.

A container lid can be used to restrict access to container contents and to prevent rodents and other animals from disturbing and removing container contents. The container lid also provides protection from wind, precipitation, and various other natural events that can disturb and contaminate the container contents.

A pivotally connected container lid, especially when used on large containers such as dumpsters, can be sized to block large container openings. A user must lift the container lid to get access to the container opening.

It is advantageous for the container lid to be lightweight and rigid to facilitate the abovementioned functions and other functions. The product provides light weight and rigidity by utilizing the hollow-molded cover to restrict access to the container.

Hollow-molded components can reduce weight and minimize material consumption by introducing significant voids inside the object. The hollow-molded component can utilize features such as ribs, internal webs, gussets, and various other features to approximate the strength and stiffness of a similar-shaped solid-molded component.

However, there are applications where it can be clearly advantageous to utilize the full strength, stiffness, and wear resistance of a solid-molded component.

For example, a container lid can experience significant wear and abuse resulting from ordinary usage and extraordinary usage. Also, the container lid often fails and breaks where the lid connects to the container.

Force and impact on the container lid can be transmitted to the container through the container lid where the lid is connected to the container. Sufficient force and impact can cause the lid to break where the lid connects to the container.

The container lid product of the invention provides increased strength and wear-resistance where the product connects to the container by utilizing the solid-molded hinge to connect to the container.

The container lid product of the invention provides light weight, rigidity, and increased ease of use by utilizing the hollow-molded cover connected to the solid-molded hinge.

Figure 1:
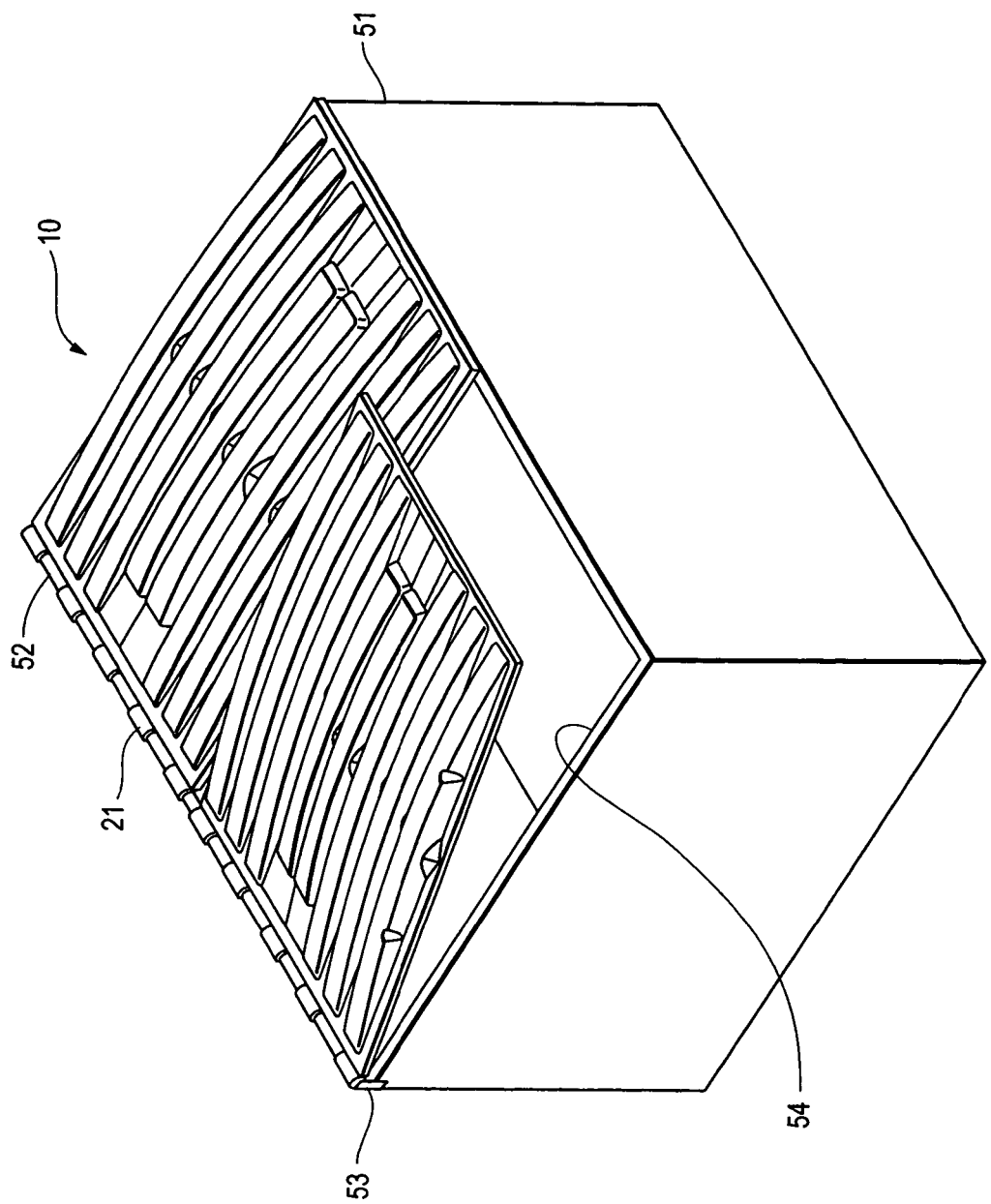
FIG. 1 depicts a perspective view of an embodiment of the product in use on a container.

The generic name "plastic" will be used hereinafter to describe plastic, polymers, and various other synthetic and semi-synthetic materials that can be molded and extruded into components.

Solid-molded, as used here and throughout, refers to a component produced by a process characterized by introducing the plastic into a solid-mold cavity and then causing the plastic to substantially wholly fill the solid-mold cavity.

Hollow-molded, as used here and throughout, refers to a component produced by a process characterized by introducing the plastic into a hollow-mold cavity having a hollow-mold cavity surface and then causing the plastic to substantially wholly coat the hollow-mold cavity surface with a plastic layer having a wall thickness.

In recent years, plastic container lids began to replace sheet metal container lids and lids made from other materials. Both solid-molded plastic container lids and hollow-molded plastic container lids can be found among the prior art.

However, neither solid-molded lids nor hollow-molded lids satisfactorily fulfill the functional requirement for a lightweight, rigid cover to span and block at least part of the container opening and the functional requirement for a robust, rugged, connection to the container.

Hollow-molded lids are able to provide light weight, rigidity, and material savings by employing "box-like", rigid, thin-wall configurations that are possible utilizing the hollow-molding process.

Solid-molded lids can be made with thick sections for additional strength. However, solid-molding processes are not well adapted for producing "box-like", rigid, thin-wall cross-sections. Solid-molded lids are typically heavy and flexible.

The product and the method of the invention solve the problem of reconciling the aforementioned functional requirements for container lids.

The product of the invention combines the strong, wear-resistant, and durable solid-molded hinge with the lightweight and rigid hollow-molded cover into a single, unitarily molded container lid product.

The method of the invention provides a molding process for molding the container lid product.

The solid-molded hinge of the product provides increased strength where the product connects to the container.

The hollow-molded cover of the product provides light weight and rigidity for increased ease of use and decreased material consumption.

Hollow-molded container lids having hollow-molded hinges can be found among the prior art. Hollow-molded container lids with hollow-molded hinges can use various methods to improve the strength and wear resistance of the hinges.

For example, hollow-molded lids have been modified by adding a separate, metal hinge tube to the hollow-molded hinge. This modification improves hinge strength and wear resistance but requires an expensive, secondary operation to add the tube.

In addition, force and impact are still transmitted by the metal hinge tube through the thin-wall sections of the hollow-molded hinge, which cannot provide maximum hinge material comparable to the solid-molded hinge.

Alternatively, some hollow-molded lids have been modified by adding a large plurality of hollow-molded hinge components so that each individual hinge component carries a small portion of the force and the impact transmitted from the lid to the container.

However, this modification also falls short of the strength of the solid-molded hinge because the plurality of hollow-molded hinge components cannot provide maximum hinge material comparable to the solid-molded hinge.

FIG. 1 shows the product 10 of the invention pivotally connected to a container 51 having a container opening 54. The product is pivotally connected to the container so that the product can rotate between an open and closed position.

In use, the product can rotate between an open position and a closed position. In the open position, the product allows access to at least a part of the container opening 54. In the closed position, the product blocks the at least part of the container opening 54 and restricts access to the at least part of the container opening.

In use, as the product rotates, the solid-molded hinge 21 supports at least part of the product and prevents the product from separating from the container 51.

The solid-molded hinge 21 provides increased strength, stiffness, and durablilty where the product pivotally connects to the container.

The solid-molded hinge pivotally connects to the container via a container feature. The container feature interacts with the hinge to enable the lid to rotate between the open position and the closed position. The container feature can comprise a hinge rod such as the hinge rod 52, and a hinge ear such as the hinge ear 53, and various other features.

The solid-molded hinge 21 pivotally connects to the container 51 by connecting to the hinge rod 52. The solid-molded hinge enables the product to pivot between the open position and the closed-position.

Alternate embodiments of the solid molded hinge can pivotally connect to the container in various ways.

A pin-shaped solid-molded hinge embodiment can pivotally connect to the container by penetrating a container feature. For example, the pin-shaped hinge can penetrate the hinge ear 53 substantially coaxially.

The container feature can be fixed to the container and the container feature can be free to rotate with the solid-molded hinge. The container feature can be connected to the container via an intermediate connecting feature and by more than one intermediate connecting feature.

For example, the container hinge rod 52 can rotate with the hinge 21 and can be fixed to the hinge ear 53.

Figure 2:
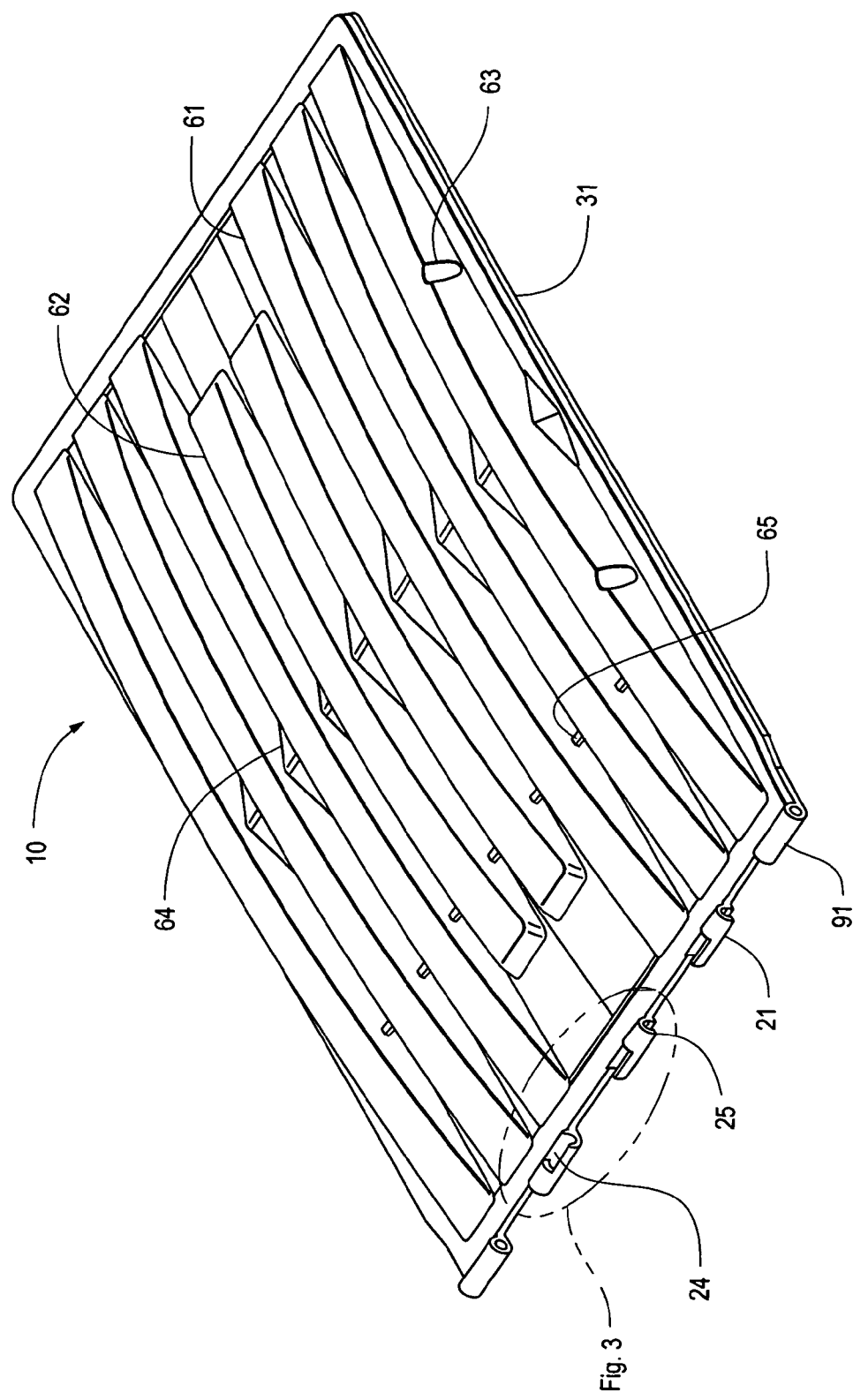
FIG. 2 depicts a perspective view of the embodiment shown in FIG. 1.

As shown in FIG. 2, the product 10 has three solid-molded hinges, such as the solid-molded hinge 21.

Figure 3:
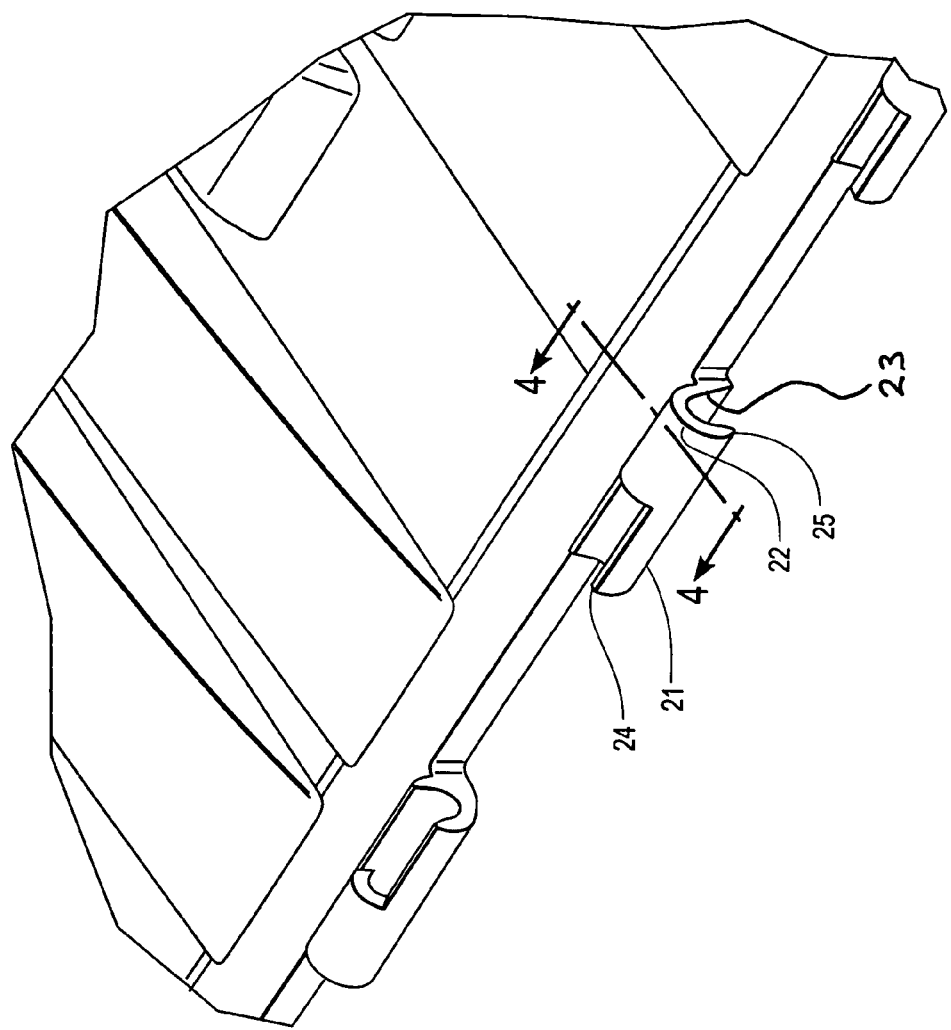
FIG. 3 depicts a partial view as indicated by line 3-3 in FIG. 2.

As shown in FIG. 3, the solid-molded hinge 21 has a hinge top surface 22 and a hinge bottom surface 23. The hinge 21 has a c-shaped up component 24 that opens toward the hinge top surface 22. The hinge 21 has a c-shaped down component 25 that opens toward the hinge bottom surface 23.

In use, the hinge 21 substantially coaxially captures the hinge rod 52 between the up component 24 and the down component 25.

Alternatively, the solid-molded hinge can have v-shaped components. Alternatively, the solid-molded hinge can have u-shaped, annular, and various curvilinear, polygonal and arbitrarily-shaped components.

Other embodiments of the product can utilize various types of solid-molded hinge so long as the hinge pivotally connects the product to the container and enables the product to pivot between the open position and the closed position.

The product of the invention further comprises a hollow-molded cover that is unitarily molded with the solid-molded hinge.

The hollow-molded cover extends outward from the solid-molded hinge and provides a rigid, lightweight, substantially planer cover for blocking the at least part of the container opening.

The hollow-molded cover comprises a top layer and a bottom layer substantially separated by a void. The top layer and the bottom layer can be joined at various locations across the cover and at a cover perimeter to provide increased stiffness and rigidity.

As shown in FIG. 2, the hollow-molded cover 31 extends outward from the solid-molded hinge and, in use, blocks the at least part of the container opening.

Figure 4:
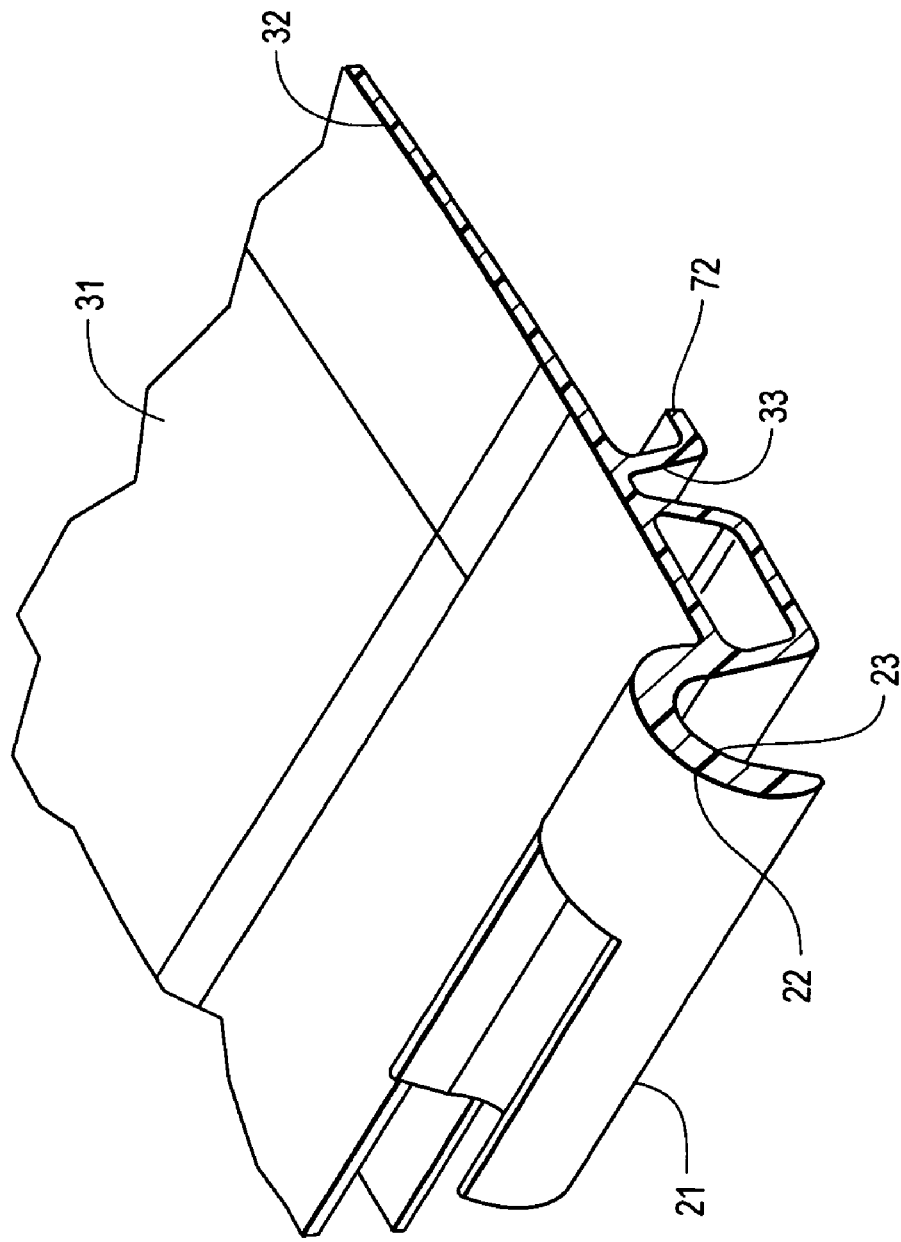
FIG. 4 depicts a section view across line 4-4 in FIG. 3.

As shown in FIG. 4, the cover 31 comprises a top layer 32 and a bottom layer 33.

The top layer 32 extends substantially continuously and substantially seamlessly from the hinge top surface 22. The bottom layer extends substantially continuously and substantially seamlessly from the hinge bottom surface 23.

Where the product transitions from the solid-molded hinge 21 to the hollow-molded cover 31, a void substantially separates the top layer 32 from the bottom layer 33.

The top layer 32 and the bottom layer 33 are substantially separated by the void and both extend substantially planarly away from the hinge.

The top layer can be crowned, curved, stepped, arched and have various other shapes.

The top layer can comprise ribs, projections, lips, troughs, and various other features and combinations thereof. Ribs, projections, lips, troughs, and various other features can be embossed, molded and formed into the cover. Ribs, projections, lips, troughs and various other features can be upstanding from the cover and can be depressed into the cover.

As shown in FIG. 2 the top layer can have stiffening ribs, such as the long rib 61 and the short rib 62.

The top layer can have standoffs, such as the standoff 63. Standoffs can provide spacing when multiple products are stacked for shipping. Standoffs can prevent adjacent products from locking together when they are stacked for shipping.

The top layer can have bend inducers, such as the primary bend inducer 64 and the secondary bend inducer 65. Bend inducers can comprise features that interrupt upstanding features and depressed features on the cover.

Bend inducers enable the cover to deflect without damaging the cover.

The bottom layer can be crowned, curved, stepped, arched and various other shapes.

The bottom layer can comprise ribs, projections, lips, troughs, and various other features and combinations thereof. Ribs, projections, lips, troughs, and various other features can be embossed, molded and formed into the cover. Ribs, projections, lips, troughs and various other features can be upstanding from the cover and can be depressed into the cover.

Figure 5:
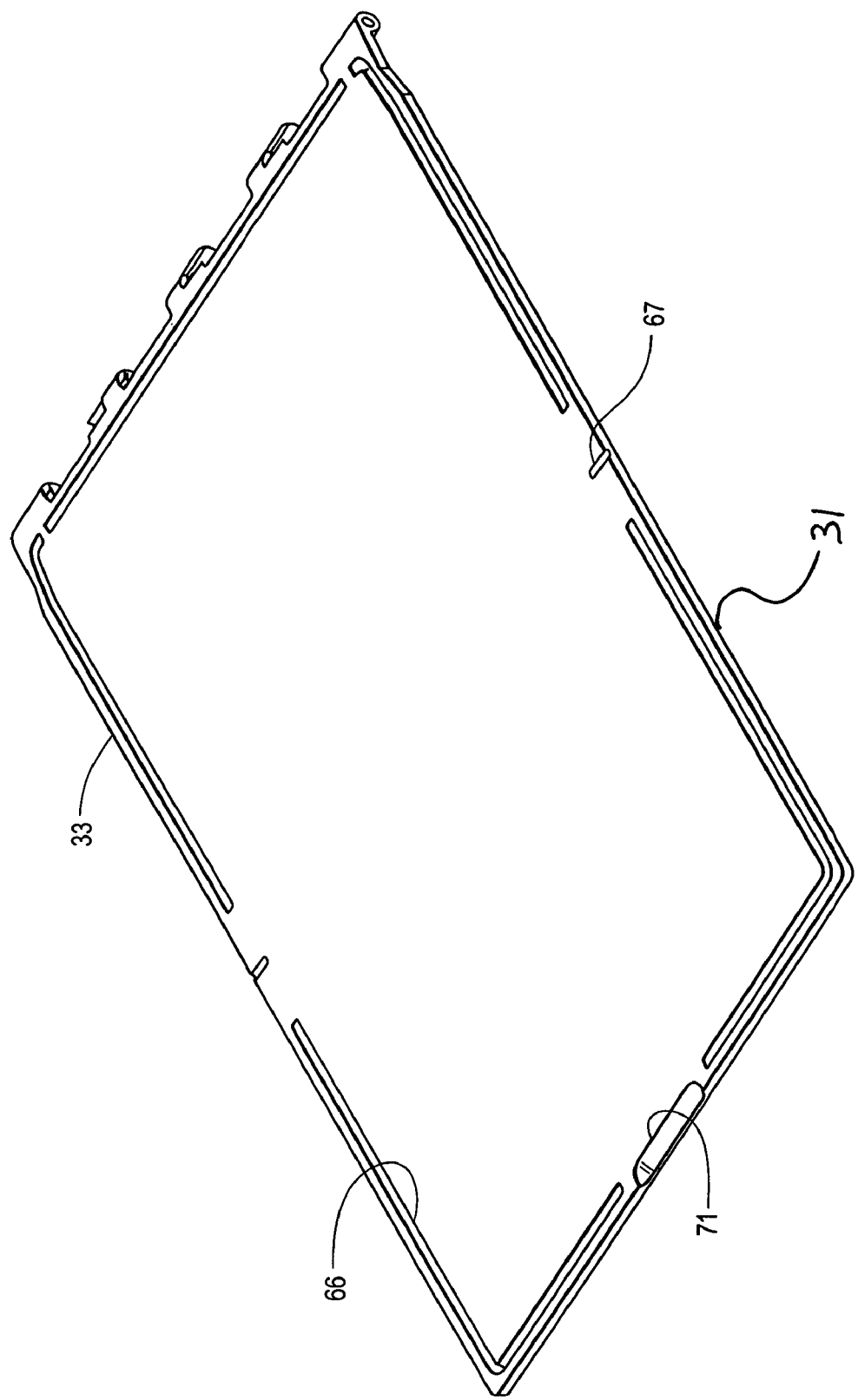
FIG. 5 depicts a perspective bottom view of an embodiment of the product. This embodiment has an intact bottom layer.

As shown in FIG. 5, the bottom layer 33 can have bend inducers, such as the bottom bend inducer 67.

The bottom layer 33 can have a recessed handgrip 71 distal the hinge. The handgrip 71 provides a convenient gripping area for rotating the cover between the open position and the closed position.

The bottom layer can have standoffs.

The bottom layer can have one or more portions removed to further minimize the product weight.

Figure 6:
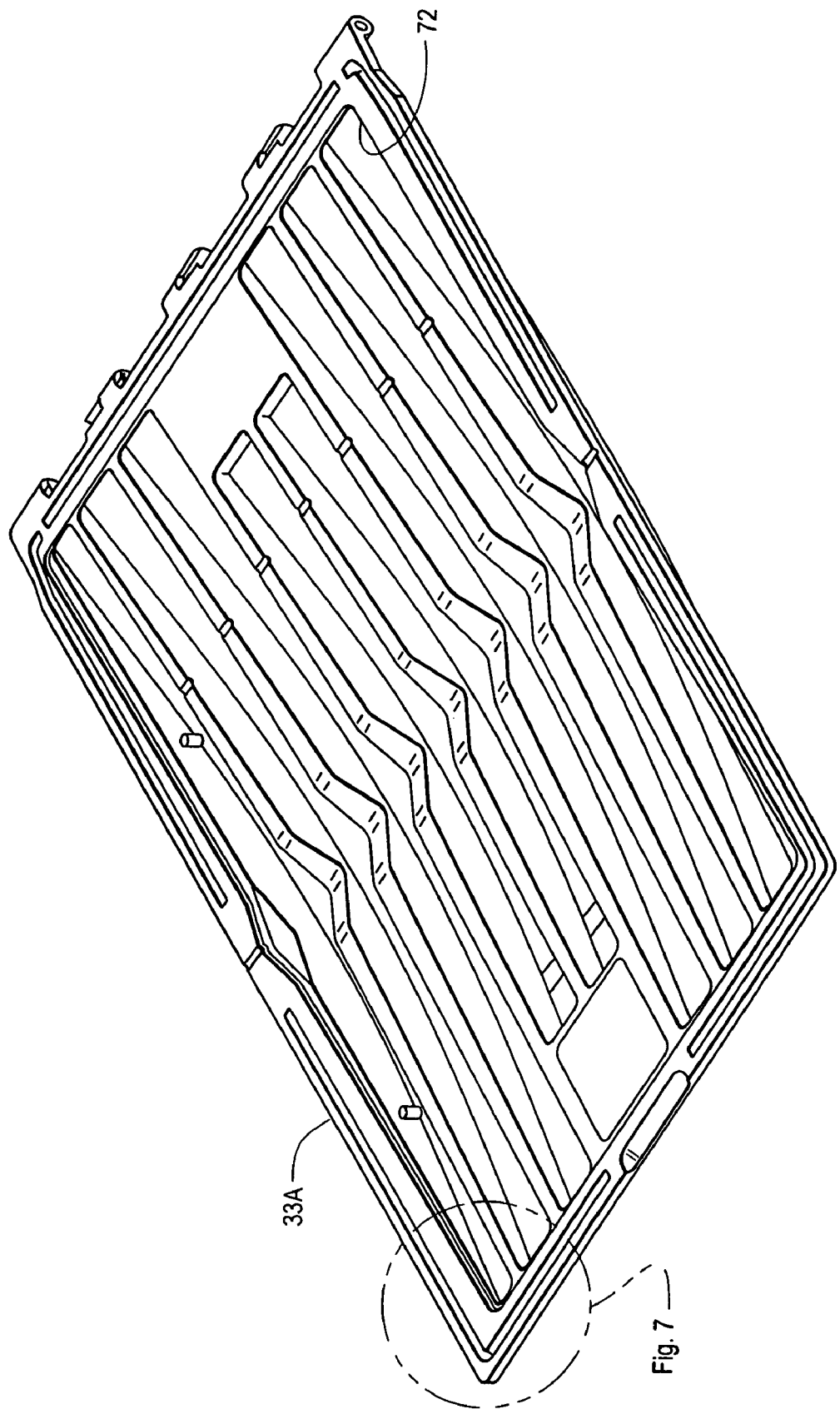
FIG. 6 depicts a perspective bottom view of an embodiment of the product. This embodiment has a bottom layer with a center portion removed.

In FIG. 6 the product has a portion removed from the bottom layer 33A. The remaining bottom layer 33A comprises an undercut lip 72.

Figure 7:
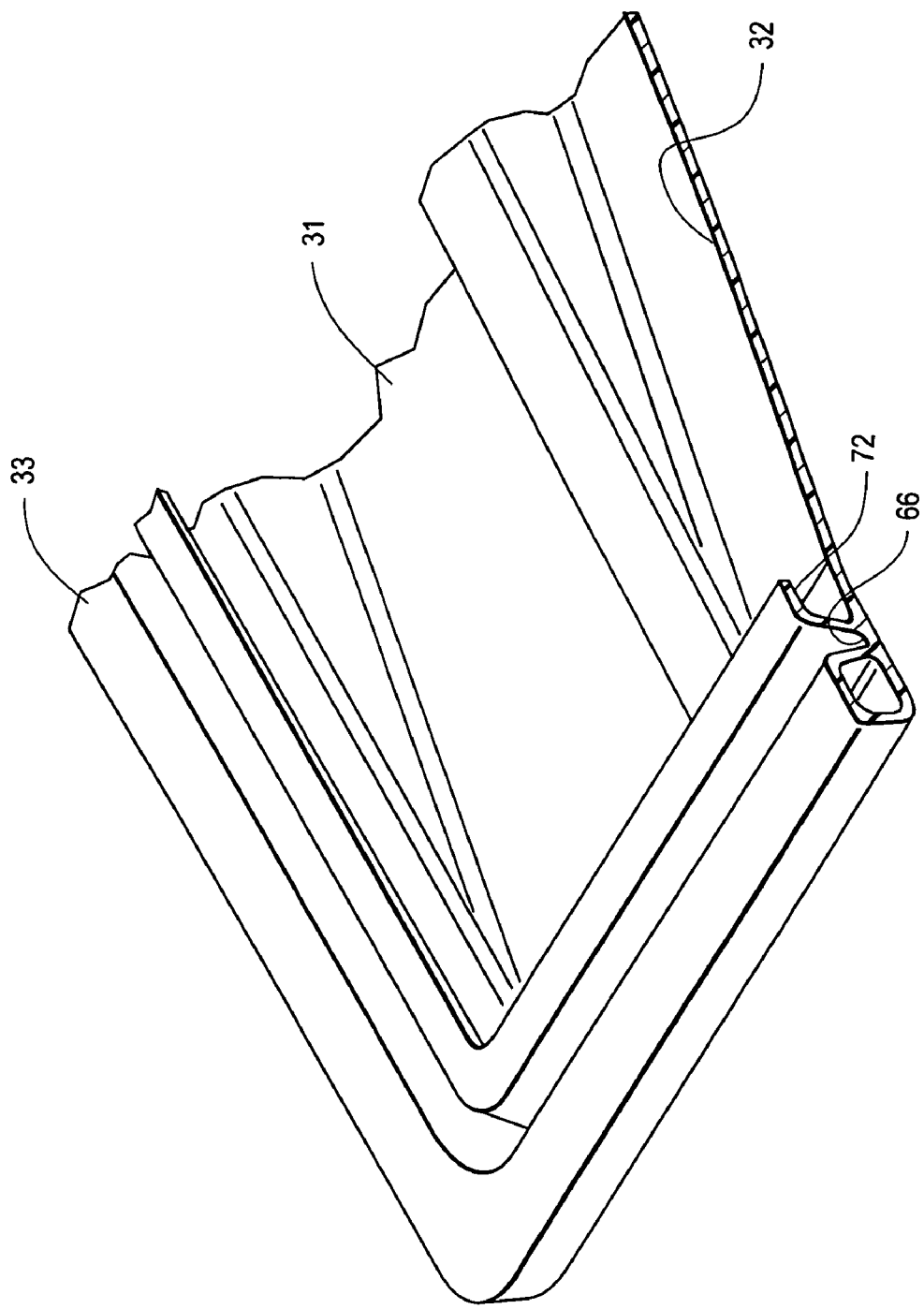
FIG. 7 is depicts a partial view as indicated by line 7-7 in FIG. 6.

As shown in FIG. 7, the undercut lip 72 adds rigidity to the hollow-molded cover in the absence of the removed portion of the bottom layer.

The cover can have a tack. The tack is formed by locally joining the top layer and bottom layer at a position distal the cover perimeter. The tack can add strength and stiffness to the hollow-molded cover.

As shown in FIG. 5, the cover 31 has tacks, such as the gutter tack 66. The gutter tack 66 is substantially formed in the bottom layer 33.

The gutter tack 66 is formed by pressing the bottom layer 33 against the top layer 32 during the molding process and joining the top layer and the bottom layer. The gutter tack 66 can add strength and rigidity to the cover.

A tack can also be substantially formed in the top layer.

The product can further comprise hollow-molded hinge guides for directing a container hinge rod through the solid-molded hinges.

In FIG. 2, the product 10 has two hollow-molded hinge guides, such as the hinge guide 91.

The method of the invention combines solid-molding and hollow-molding into a single unitary process. As used here and throughout, unitarily molded means that the solid-molded components of the product and the hollow-molded components of the product are manufactured in a single molding operation and in a single mold.

Solid-molding as used here and throughout, refers to a molding process characterized by introducing plastic into a solid-mold cavity and then causing the plastic to substantially wholly fill the solid-mold cavity.

Various means can be utilized to cause the plastic to wholly fill the solid-mold cavity. For example, a piston can be used to force the plastic into the solid-mold cavity. The piston can be moved by mechanical linkage, by pressurized gas, and various other movers.

Alternatively, the plastic can be liquefied and poured into the solid-mold cavity, thereby using gravity to cause the plastic to fill the solid-mold cavity.

Alternatively, the solid-mold cavity can be made smaller after the plastic is introduced into the solid-mold cavity. As the solid-mold cavity is made smaller, the plastic is caused to fill the remaining solid-mold cavity.

Various other means for causing the plastic to substantially wholly fill the solid-mold cavity can be used.

Hollow-molding as used here and throughout, refers to a molding process characterized by introducing plastic into a hollow-mold cavity having a hollow-mold cavity surface and then causing the plastic to substantially wholly coat a hollow-mold cavity surface with a plastic layer having a wall thickness.

In the hollow-molding process, the hollow-mold cavity surface is coated with the plastic layer, as compared to the solid-molding process where the solid-mold cavity is filled with plastic.

In the hollow-molding process, the hollow-mold cavity, except where the plastic layer coats the cavity surface, can contain air and other gasses. The air and other gasses can be pressurized.

The hollow-molding process can utilize pressurized gas to cause the plastic to coat the hollow-mold cavity surface. The hollow-molding process can utilize pressurized gas to hold the plastic layer in place against the hollow-mold cavity surface.

Alternatively, the hollow-molding process can utilize rotation to generate centripetal forces in the plastic, causing the plastic to coat the hollow-mold cavity surface and holding the plastic layer in place against the hollow-mold cavity surface.

Alternatively, the hollow-molding process can utilize other means to cause the plastic to coat the hollow-mold cavity surface, and can utilize combinations of the aforementioned means and various other means to cause the plastic to coat the hollow-mold cavity surface.

The hollow-molding process can produce components with hollow cross-sections. The hollow-molding process can produce features like undercuts, reverse curved surfaces, and closed, box-structures that can be difficult and expensive to produce with the solid-molding process.

The hollow-molded component can utilize internal ribs, walls, troughs, and various other features that increase the strength and rigidity of the part without significantly increasing weight. Similar features can be difficult and expensive to produce with the solid-molding process.

The method of the invention comprises a plastic inserting step for introducing plastic into a mold. The mold comprises a mold cavity. The mold cavity further comprises a solid-mold cavity and a hollow-mold cavity. The hollow-mold cavity comprises a hollow-mold cavity surface.

The plastic inserting step can be various methods for introducing plastic into the mold.

For example, the plastic can be inserted into the mold by opening the mold and placing the plastic into the mold. The plastic can be inserted into an alternate location connected to the mold and then inserted into the mold by various mechanical means; for example, inserted via piston, pressurized gas, spring, and other means and combinations thereof.

Alternatively, the plastic can be introduced into the mold via gravity and other means.

The inserting step of the method can occur concurrently with other steps of the method.

Figure 8:
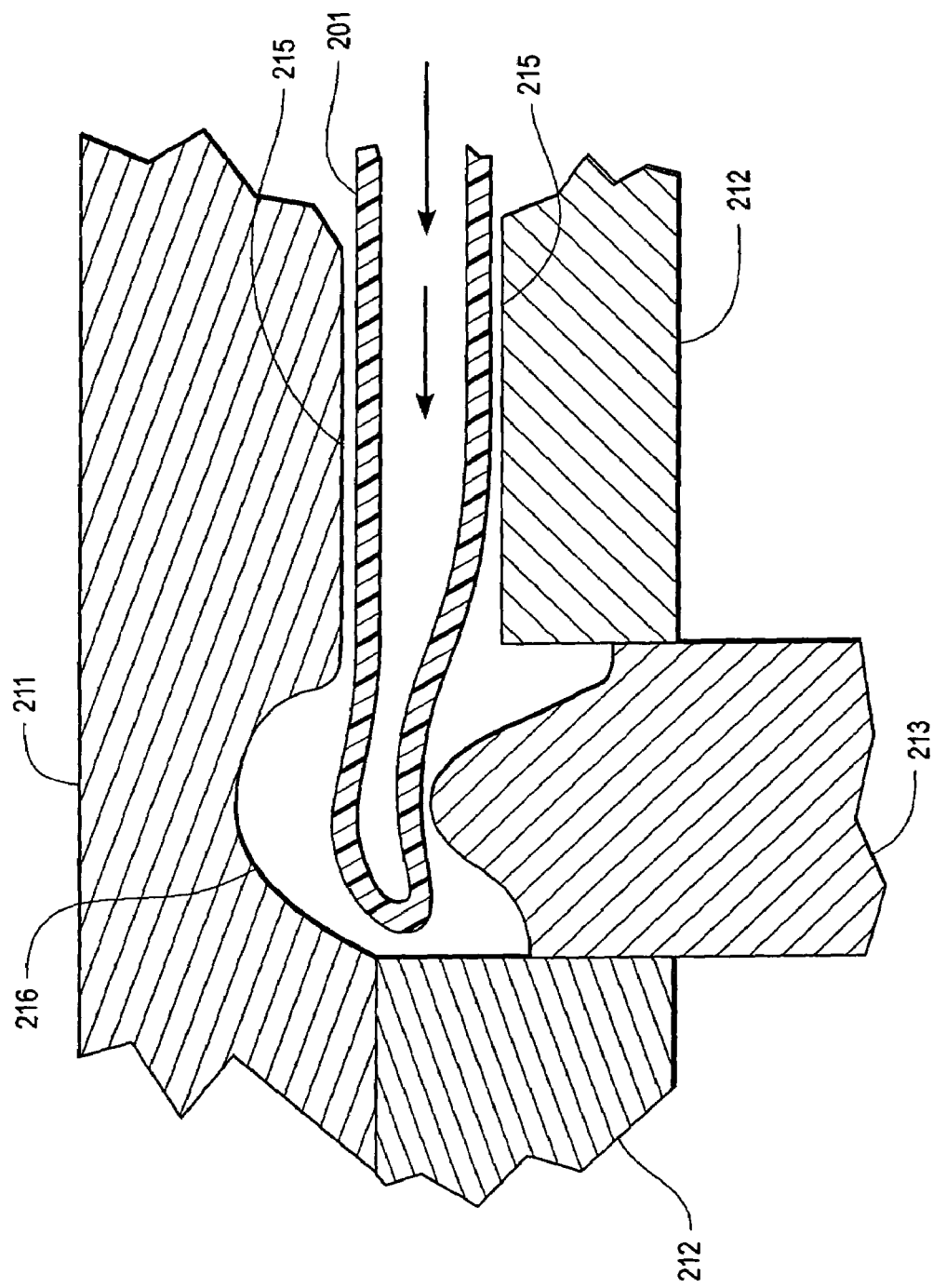
FIG. 8 is a section view depicting a step of the method of the invention.
Figure 9:
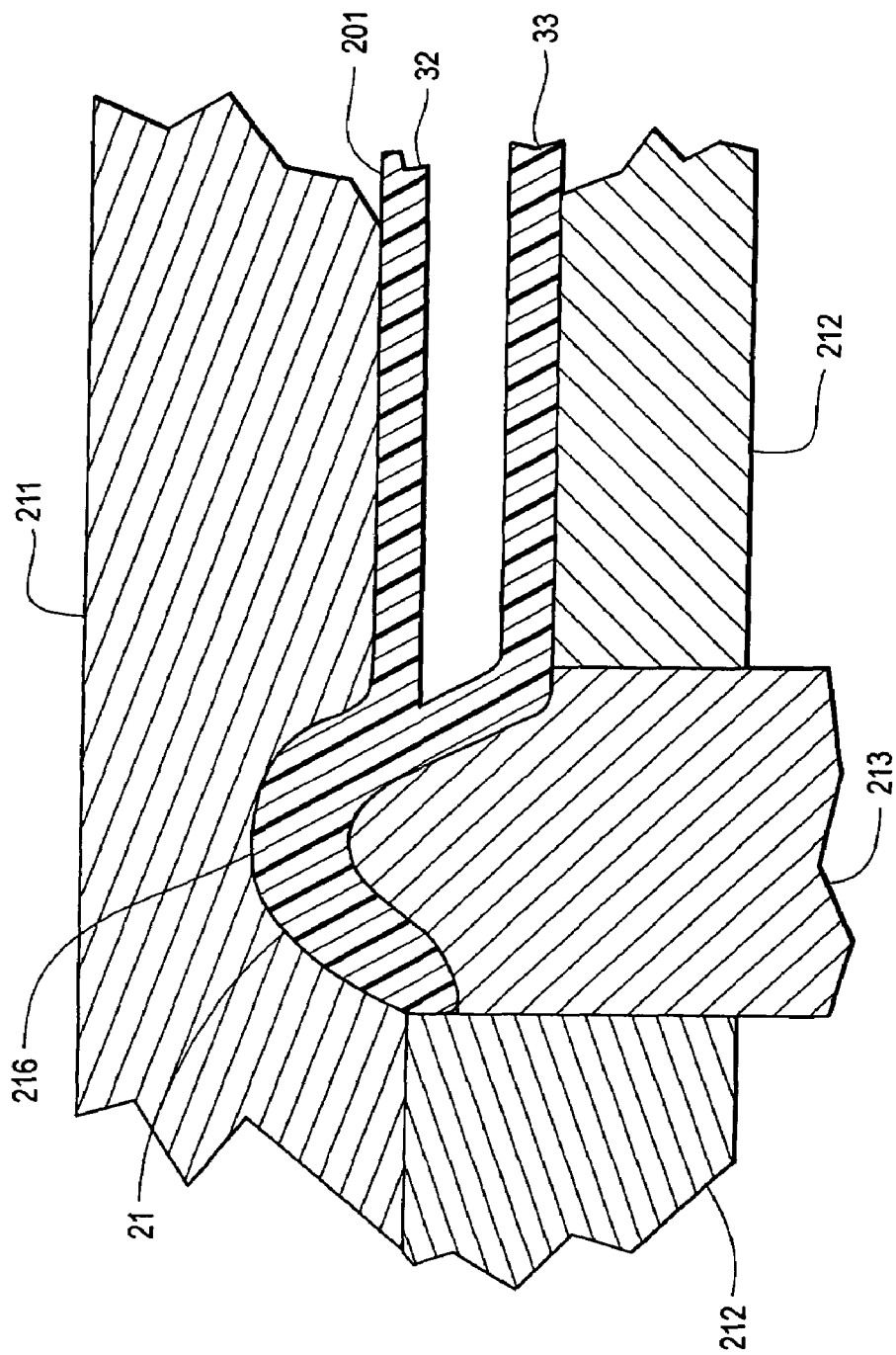
FIG. 9 is a section view depicting a step of the method of the invention.

In the embodiment of the method of the invention shown in FIG. 8, the plastic is inserted by hand into the mold cavity that exists between the upper mold 211 and the lower mold 212.

The method further comprises a layering step. The layering step causes the plastic to substantially wholly coat the hollow-mold cavity surface.

The layering step can utilize various means for causing the plastic to coat the hollow-mold cavity surface. For example, the various means utilized by the aforementioned hollow-molding process can be utilized in the layering step.

The layer step of the method can occur concurrently with other steps of the method.

In the embodiment shown in FIG. 8, pressurized gas is used to cause the plastic to substantially wholly coat the hollow-mold cavity surface 215 with a plastic layer 201.

The method further comprises a solidifying step where the plastic is caused to substantially wholly fill the solid-mold cavity.

The solidifying step can utilize various means for causing the plastic to fill mold cavity. For example, the various means utilized by the aforementioned solid-molding process can be utilized in the solidifying step.

The solidifying step of the method can occur concurrently with other steps of the method.

As shown in FIG. 8, the mold can further comprise a movable mold 213 having a retracted position and an inserted position. As shown in FIG. 8, the movable mold 213 is in the retracted position.

As shown in FIG. 8, the mold can further comprise a movable mold 213 having a retracted position and an inserted position. As shown in FIG. 8, the movable mold 213 is in the retracted position.

The solid-molded hinge 21 is formed when the movable mold 213 moves to the inserted position and causes the mold cavity to become smaller.

The cover top layer 32 and the cover bottom layer 33 extend outwards from the solid-molded hinge 21. The top layer 32 and the bottom layer 33 are separated by a void.

The method of the invention can form a tack within the hollow-molded cover. For example, the method can form gutter tacks within the cover, such as the gutter tack 66.

Tacks within the hollow-molded cover can further stiffen and strengthen the hollow-molded cover without significantly increasing weight and material consumption.

The mold can further comprise a tack mold for molding tacks within hollow-molded cover. The tack mold has a tack-retracted position and a tack-inserted position.

Figure 10:
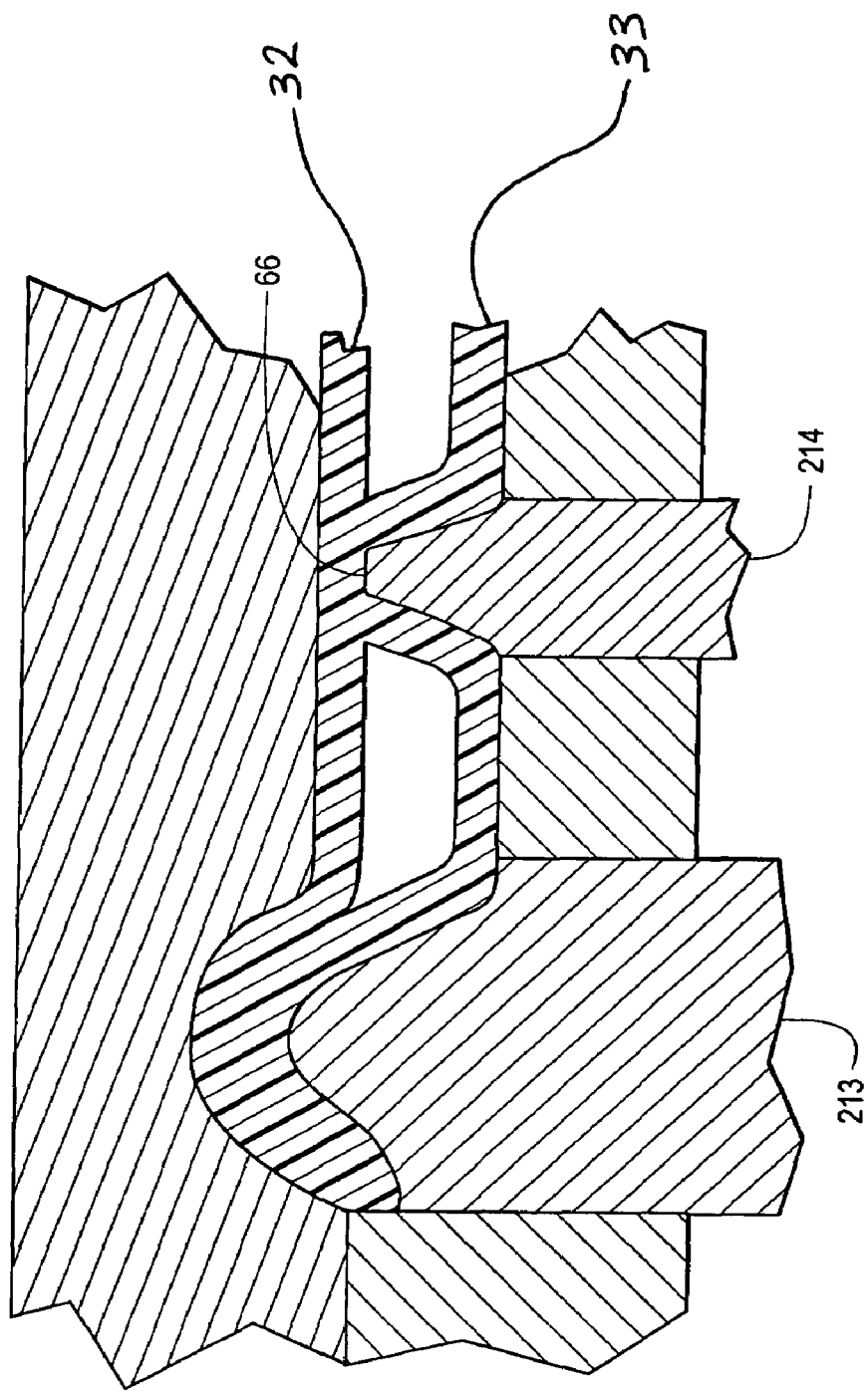
FIG. 10 is a section view depicting a step of the method of the invention.

In the embodiment shown FIG. 10, the method of the invention utilizes the movable mold 213 and the tack mold 214. The movable mold 213 is shown in the inserted position and the tack mold 214 is shown in the tack-inserted position.

The gutter tack 66 is formed when the tack mold 214 moves to the tack-inserted position and causes the cover top layer 32 and the cover bottom layer 33 to join proximal the tack mold 214.

The invention claimed is:

1. A container lid product for controlling access to a container, the container having a container opening, the product being pivotally connected to the container via a container feature, the product in use pivoting between an open position and a closed position to control access to the container, the product comprising:
    a solid-molded hinge in use pivotally connecting the product to the container;
    a hollow-molded cover being connected to the solid-molded hinge,
    the hollow-molded cover in use in the closed position blocking at least part of the container opening;
    the solid-molded hinge and the hollow-molded cover being unitarily molded;
    the solid-molded hinge comprising:
        a hinge top surface and a hinge bottom surface,
            the hinge top surface and the hinge bottom surface being formed by molding;
            when in use, at least one of the hinge top surface and the hinge bottom surface, contacting the container feature;
    the hollow-molded cover comprising:
        a top layer;
        the top layer extending substantially continuously from the hinge top surface;
        a bottom layer;
        the bottom layer extending substantially continuously from the hinge bottom surface;
        the bottom layer being substantially opposite the top layer;
        a void separating the top layer and the bottom layer;
        the void extending to abut the hinge and terminating before extending into the hinge; and
        the hollow-molded cover extending substantially planarly away from the hinge;
        wherein the hinge is substantially void-free.

2. The container lid product of claim 1 wherein the solid-molded hinge further comprises:
    a c-shaped up component,
    the up component having a c-shape opening towards the hinge top surface; and
    a c-shaped down component,
    the down component having a c-shape opening towards the hinge bottom surface.

* * * * *